P. HANSON.
CREAM TEMPERING DEVICE.
APPLICATION FILED AUG. 14, 1912.
1,095,727.
Patented May 5, 1914.
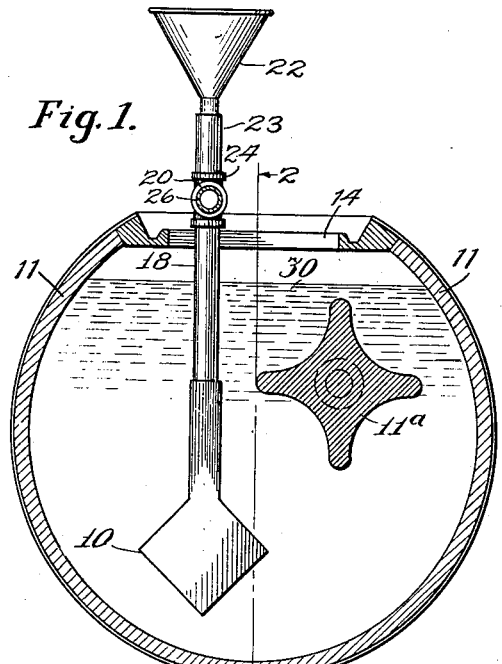
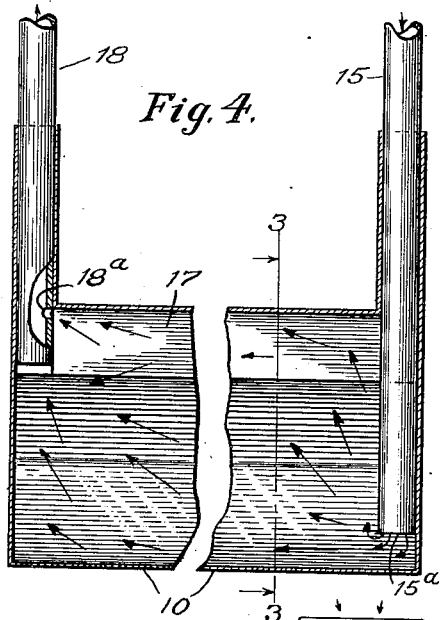
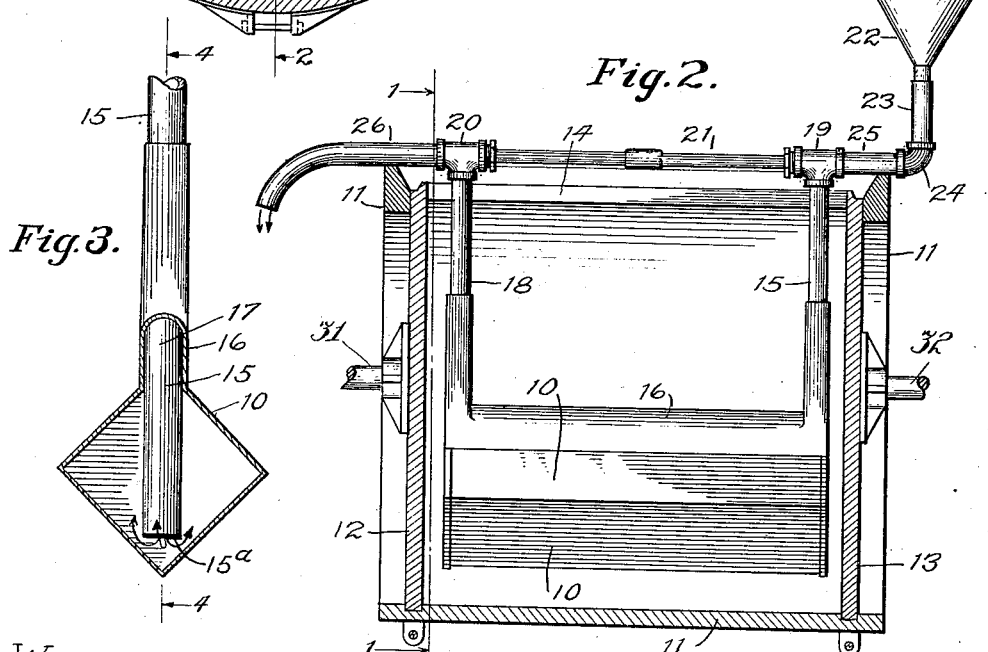
WITNESSES:
L. B. Graham
H. B. McCabe
INVENTOR:
Paul Hanson
By Brown & Hopkins
Attys

UNITED STATES PATENT OFFICE.

PAUL HANSON, OF WILD HORSE, COLORADO.

CREAM-TEMPERING DEVICE.

1,095,727.  Specification of Letters Patent.  Patented May 5, 1914.

Application filed August 14, 1912. Serial No. 714,959.

*To all whom it may concern:*

Be it known that I, PAUL HANSON, a citizen of the United States, residing at Wild Horse, in the county of Cheyenne and State of Colorado, have invented certain new and useful Improvements in Cream-Tempering Devices, of which the following is a full, clear, and exact specification.

The invention relates to devices and processes for tempering or regulating the temperature of cream preparatory to churning in the process of butter making.

The primary object of the invention is to provide a process and a simple and efficient device for tempering and ripening cream before beginning the operation of churning.

A further object of the invention is to provide a simple and efficient device which may be removably inserted within a churn for the purpose of ripening cream placed therein and regulating the temperature of the same before churning, thus dispensing with the necessity for the use of so-called pasteurizers, tempering or ripening vats and the like, as ordinarily used in creameries, since with the use of the invention the churn body is used as a receptacle to hold the cream during the process of ripening and tempering.

Other objects of the invention will hereinafter appear and are shown in the accompanying drawings forming part of the specification, and in which—

Figure 1 is a sectional view through a churn, showing the manner of removably inserting the device in the same for tempering cream contained therein. This view is taken on line 1—1 of Fig. 2, which latter view is a vertical longitudinal sectional view through the churn showing other details of construction of the device. In this view the device of the invention is shown in side elevation. Fig. 3 is a sectional view through the cream tempering device taken approximately on the line 3—3 of Fig. 4, looking in the direction indicated by the arrows. Fig. 4 is a sectional view through the cream tempering device, taken approximately on line 4—4 of Fig. 3, the view being taken in the direction indicated by the arrows.

In the preferred embodiment of the invention as shown in the drawings, the device consists of a somewhat elongated hollow chamber indicated by the reference character 10. This chamber is preferably, although not necessarily, quadrangular in cross section, and it may be formed of sheet metal preferably relatively thin in order to serve as a ready conductor of the temperature of liquids, since the device may be used either for the purpose of lowering or raising the temperature of liquids within the churn.

In the present embodiment of the invention, the invention is shown applied to a churn of cylindrical form, the side walls of which are indicated by the reference character 11 and the end walls by 12, 13. The body portion 10 of the tempering device is preferably of a length almost but not quite equal to the total inside clearance of the churn, and the churn itself is provided with an opening indicated by the reference character 14, which is adapted to be closed by a door of the usual or any desired form not shown, since it forms no part of the invention. It is desirable that the door opening 14 shall extend from end to end of the churn in order that the body portion 10 of the cream tempering device may be as long as possible so that it will be distributed approximately throughout the length of the churn in order to secure the maximum effect in imparting the temperature of the liquids within the tempering device to the liquid contents of the churn.

The body portion 10 of the tempering device is provided adjacent one end thereof with an intake pipe 15, which preferably extends down along one end of the body part 10 to a point adjacent the extreme lowermost portion of the inside thereof as indicated at 15ª, in order to discharge the tempering liquid as nearly as possible at the bottom of the body of the device. Although it is not an indispensable feature of my construction I prefer to extend the sheet metal of the body part 10 upwardly for some distance along the pipe 15 for strengthening purposes, and to increase the capacity of the body portion 10 and to furnish an air cavity at the top the two upper side walls of the body part are terminated a short distance from where they would join if continued and an elongated dome of metal, preferably a continuation of metal upwardly around the intake pipe 15, is joined to the body part, which part is indicated by the reference character 16 and the cavity therein by the reference character 17.

At the opposite extremity of the body member 10 an outward exhaust pipe is provided, being led into the body portion 10 and secured therein in a manner similar to that already described for insertion of the intake pipe 15. This outward exhaust pipe is indicated by the reference character 18, and unlike the inlet pipe 15 it does not extend toward the bottom of the interior of the body portion but a short distance, really entering the upper dome portion only for a portion of its height. Like the intake pipe 15, the lower extremity of the outlet pipe 18 is open, and to permit the liquid to rise within the dome portion 17 an air vent is provided in the outlet 18 above the lower portion thereof, as indicated at 18$^a$, which will permit the escape of the air through this pipe and allow the liquid to rise within the body portion, thus increasing the radiating surface.

Obviously the liquid for imparting its temperature to the liquid contents of the churn may be brought to the intake pipe 15 and led from the exhaust or outlet 18 in any desired manner, but for convenience I prefer to provide the fittings as indicated at 19 and 20 on the tops of the pipes 15 and 18 respectively, these being in the form of angle fittings adapted to be connected by the rod 21, which connection may be adjustable as indicated. I prefer to provide a funnel as indicated at 22 and a connecting pipe leading therefrom as at 23 with the angular connection 24 and the short pipe 25 connecting the same with the fitting 19. To the fitting 20 is attached a hollow pipe 26 downwardly discharging to which the overflow liquid from the tempering device may be discharged directly or by means of any suitable conducting medium.

So far as I know I am the first to ripen cream in the churn, or by a process which is substantially as follows: The cream is placed in the churn with the doorway to the churn unobstructed. The cream tempering device is placed in the churn, a liquid medium is circulated through the cream tempering device which alters the temperature of the cream as far as desired. When the cream is of the requisite temperature the tempering device is removed, the doorway of the churn closed and the churn is operated for the separation of the butter fat.

What I claim is:

1. In a cream tempering device consisting of a hollow chamber with upwardly extending intake and outlet pipes at opposite ends thereof, the combination with said chamber of an intake pipe adapted to discharge its contents into the chamber adjacent the lower extremity of the chamber, and an outlet pipe adapted to receive the outgoing medium at a point adjacent the upper extremity of said chamber.

2. In a removable cream tempering device consisting of a single hollow receptacle with upwardly extending intake and outlet pipes, the combination with said receptacle of an intake pipe adapted to discharge its contents adjacent the lower extremity of the receptacle, and an outlet pipe adapted to receive the outgoing medium at a point adjacent the upper extremity of said receptacle.

3. In a removable cream tempering device consisting of a single hollow chamber with upwardly extending intake and outlet pipes, the combination with said chamber of an intake pipe adapted to discharge its contents adjacent the lower extremity of the chamber, and an outlet pipe adapted to receive the outgoing medium at a point adjacent the upper extremity of said chamber, said cream tempering device being adapted to admit of the unrestricted flow therethrough of a liquid medium.

4. In a removable cream tempering device consisting of a hollow chamber of such length that when inserted into a churn its extremities are adjacent the extremities of the interior of the churn, the combination with said hollow chamber of upwardly extending intake and outlet pipes, the intake pipe adapted to discharge its contents into the chamber adjacent the lower extremity at one end thereof, and the outlet pipe adapted to receive the contents of the chamber adjacent the upper extremity at the other end thereof.

5. In a removable cream tempering device consisting of a hollow chamber of such length that when inserted into a churn its ends are adjacent the interior ends of the churn and having upwardly extending intake and outlet pipes, the combination with said chamber and pipes, of upwardly extending portions of said chamber surrounding said pipes, and an elongated dome above and forming a part of said chamber disposed between said intake and outlet pipes and adapted to strengthen said cream tempering device.

In testimony whereof I have signed my name to this specification, in the presence of two subscribing witnesses, on this 10th day of August, A. D. 1912.

PAUL HANSON.

Witnesses:
G. B. BENNETT,
G. J. SCHAFER.